(12) United States Patent  
Kobayashi et al.

(10) Patent No.: US 12,189,864 B2  
(45) Date of Patent: Jan. 7, 2025

(54) INFORMATION PROCESSING APPARATUS AND INFORMATION PROCESSING METHOD BASED ON INPUT OPERATION BY USER

(71) Applicant: SONY SEMICONDUCTOR SOLUTIONS CORPORATION, Kanagawa (JP)

(72) Inventors: Suguru Kobayashi, Kanagawa (JP); Ryuichi Omiya, Kanagawa (JP); Takahisa Ohgami, Kanagawa (JP); Takumi Tsuji, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/921,280

(22) PCT Filed: Mar. 24, 2021

(86) PCT No.: PCT/JP2021/012422  
§ 371 (c)(1),  
(2) Date: Oct. 25, 2022

(87) PCT Pub. No.: WO2021/225044  
PCT Pub. Date: Nov. 11, 2021

(65) Prior Publication Data  
US 2023/0168744 A1 Jun. 1, 2023

(30) Foreign Application Priority Data  
May 8, 2020 (JP) .................................. 2020-082436

(51) Int. Cl.  
*G06F 3/048* (2013.01)  
*G06F 3/01* (2006.01)  
(Continued)

(52) U.S. Cl.  
CPC ............ *G06F 3/017* (2013.01); *G06F 3/0482* (2013.01); *G06V 40/28* (2022.01)

(58) Field of Classification Search  
None  
See application file for complete search history.

(56) References Cited

U.S. PATENT DOCUMENTS

| | | | |
|---|---|---|---|
| 2015/0193124 A1* | 7/2015 | Schwesinger | G06F 3/04812 715/863 |
| 2019/0102043 A1* | 4/2019 | Lee | G06F 3/03 |
| 2020/0371673 A1* | 11/2020 | Faulkner | G06F 3/017 |

FOREIGN PATENT DOCUMENTS

| | | |
|---|---|---|
| JP | 2014-219938 A | 11/2014 |
| JP | 2017-117341 A | 6/2017 |

(Continued)

OTHER PUBLICATIONS

International Search Report and Written Opinion of PCT Application No. PCT/JP2021/012422, issued on Apr. 27, 2021, 09 pages of ISRWO.

*Primary Examiner* — Claudia Dragoescu  
(74) *Attorney, Agent, or Firm* — CHIP LAW GROUP (57) ABSTRACT

The present invention is an information processing apparatus adapted to a user interface that enables non-contact operation according to a screen displayed on a display. The information processing apparatus includes an input operation identification unit that identifies predetermined input operation on the basis of a sequence of position information of a specific part of a user in a predetermined spatial coordinate system, and a processing execution unit that executes predetermined processing on the basis of identified the predetermined input operation. The input operation identification unit identifies the predetermined input operation in a case of judging, on the basis of a second sequence of the position information, that the specific part of the user (Continued)

is in a moving state after the specific part of the user is in a staying state at a reference position in the predetermined spatial coordinate system on the basis of a first sequence of the position information.

11 Claims, 7 Drawing Sheets

(51) Int. Cl.
    *G06F 3/0482*      (2013.01)
    *G06V 40/20*      (2022.01)

(56) References Cited

FOREIGN PATENT DOCUMENTS

| | | |
|---|---|---|
| JP | 2019-522860 A | 8/2019 |
| WO | 2015/030264 A1 | 3/2015 |

* cited by examiner

INFORMATION PROCESSING APPARATUS AND INFORMATION PROCESSING METHOD BASED ON INPUT OPERATION BY USER

CROSS REFERENCE TO RELATED APPLICATIONS

This application is a U.S. National Phase of International Patent Application No. PCT/JP2021/012422 filed on Mar. 24, 2021, which claims priority benefit of Japanese Patent Application No. JP 2020-082436 filed in the Japan Patent Office on May 8, 2020. Each of the above-referenced applications is hereby incorporated herein by reference in its entirety.

TECHNICAL FIELD

The present disclosure relates to technology for a user interface, and more particularly, to an information processing apparatus that executes, and an information processing method for executing, processing on the basis of input operation by a user via a user interface, and to a computer program for executing the method.

BACKGROUND ART

There has been proposed a user interface with which a user interactively operates a computing device without touching a screen directly with a fingertip. The user interface for the user to interactively operate the computing device in a non-contact manner detects, as a pseudo input operation, a gesture of the user with respect to an icon or object representing, for example, a button displayed on a screen of a physical display.

For example, Patent Document 1 below discloses a technique capable of performing feedback to a user in a case where non-contact operation is performed without using a controller. Specifically, Patent Document 1 discloses a technique to continuously acquire space coordinates of a specific part of a user via a detector and, based on the updated space coordinates, perform display control to move a marker to a corresponding position on a display screen of a display unit, where an initial shape of the marker includes a plurality of shapes obtained by dividing any desired shape, and display control is performed that separates the plurality of shapes more widely from each other from the corresponding position on the display screen as a distance of the space coordinates to a certain plane in a coordinate system of the space coordinates is longer and brings the plurality of shapes closer to each other to the corresponding position on the display screen as the distance is shorter. Furthermore, Patent Document 1 discloses a technique to define, in front of the display screen, the certain plane (plane of a virtual touch panel) in the spatial coordinate system, and in a case where the spatial coordinates of the continuously acquired and updated specific part of the user has passed the plane of the virtual touch panel, detects as press operation by the user.

CITATION LIST

Patent Document

Patent Document 1: Japanese Patent Application Laid-Open No. 2014-219938

SUMMARY OF THE INVENTION

Problems to be Solved by the Invention

In the above-described conventional Patent Document 1, the virtual touch panel in the spatial coordinate system is required to be defined in front of the display screen in order to detect press operation by the user. However, there has been a problem of insufficient operability because, although not actually being able to visually recognize the virtual touch panel, the user needs to make a gesture of moving a finger or the like while always being conscious of a spatial position of the virtual touch panel.

Therefore, the present disclosure provides technology related to a user interface that enables non-contact input operation with excellent operability.

Specifically, one object of the present disclosure is to provide technology related to a user interface that allows a user to perform, when performing non-contact input operation on a screen of a physical display, the input operation without being conscious of a virtual touch panel or the like.

Furthermore, an object of the present disclosure is to provide technology related to a user interface that allows the user to select, with a simple and/or intuitive operation in a non-contact manner, an icon or the like displayed on a screen of the physical display.

Solutions to Problems

The technology (present technology) according to the present disclosure for solving the above-described problem includes the following matters specifying the invention or technical features.

The present technology according to a certain aspect is an information processing apparatus adapted to a user interface that enables non-contact input operation according to a screen displayed on a display. The information processing apparatus includes an input operation identification unit that identifies predetermined input operation on the basis of a sequence of position information of a specific part of a user in a predetermined spatial coordinate system, and a processing execution unit that executes predetermined processing on the basis of the predetermined input operation identified by the input operation identification unit. Then, the input operation identification unit judges, on the basis of a first sequence of the position information, whether or not the specific part of the user is in a staying state at a reference position in the predetermined spatial coordinate system, and in a case of having judged that the specific part of the user is in the staying state, further judges, on the basis of a second sequence of the position information, whether or not the specific part of the user is in a moving state. In a case of judging that the specific part of the user is in the moving state, the input operation identification unit identifies the predetermined input operation.

Furthermore, the present technology according to another aspect is an information processing method based on input operation by a user via a non-contact user interface. The information processing method includes displaying a predetermined screen on a display, acquiring a sequence of position information of a specific part of the user in a predetermined spatial coordinate system with respect to the predetermined screen, identifying predetermined input operation on the basis of acquired the sequence of the position information, and executing predetermined processing on the basis of identified the predetermined input operation. Then, the identifying the predetermined input operation includes judging, on the basis of a first sequence of the position information, whether or not the specific part of the user is in the staying state at a reference position in the predetermined spatial coordinate system, after judging that the specific part of the user is in the staying state, judging, on the basis of a second sequence of the position information, whether or not the specific part of the user is in a moving state, and in a case of judging that the specific part of the user is in the moving state, identifying the predetermined input operation.

Moreover, the present technology according to another aspect is a computer program for causing an information processing apparatus to implement an information processing method based on input operation by a user via a non-contact user interface.

Note that, in the present disclosure, a "system" refers to a logical assembly of a plurality of apparatuses (or functional modules that implement specific functions), and each of the apparatuses or functional modules may be or may not in a single housing. Furthermore, a "means" does not simply mean a physical means, and includes a case where a function of the means is implemented by software. Furthermore, a function of one means may be implemented by two or more physical means, or functions of two or more means may be implemented by one physical means. Furthermore, a "means" can be read as, for example, a term such as a "unit" or a "module", and should not be construed as being limited to a specific "object" in the present disclosure.

Other technical features, objects, effects, or advantages of the present technology will be clarified by the following embodiments described with reference to the accompanying drawings. Furthermore, the effects described herein are only examples, and the effects of the present disclosure are not limited to these effects. Additional effects may also be obtained.

MODE FOR CARRYING OUT THE INVENTION

Hereinafter, an embodiment of the present technology will be described with reference to the drawings. However, the embodiment described below is merely an example, and various modifications and applications of techniques not explicitly described below are not intended to be excluded. The present technology can be implemented by various modifications (for example, combination of each embodiment, or the like) within the scope thereof. Furthermore, in the following description of the drawings, the same or similar parts are denoted by the same or similar reference signs. The drawings are merely schematic representations, and dimensions and ratios of the dimensions therein or the like do not necessarily match the actual ones. Parts having different dimensional relations or ratios different between the drawings may be included.

Figure 1:
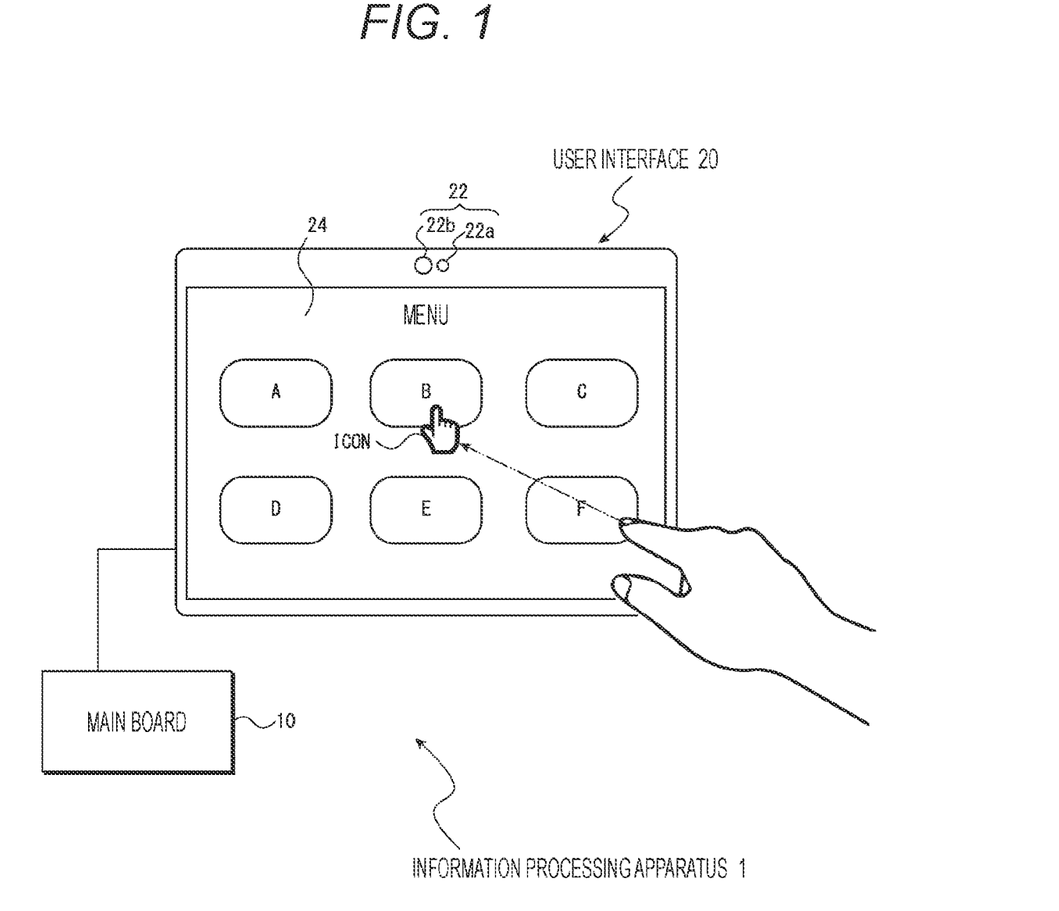
FIG. 1 is a schematic diagram for describing a user interface using an information processing apparatus according to an embodiment of the present technology.

FIG. 1 is a schematic diagram for describing a user interface using an information processing apparatus according to an embodiment of the present technology. An information processing apparatus 1 of the present embodiment is a computing device adapted to a user interface that enables non-contact interactive operation. The non-contact interactive operation is, for example, operation that enables input or an instruction to a screen displayed on a display, with movement of a specific part (for example, a finger or the like) of a user, without the user touching the screen. As illustrated in the drawing, the information processing apparatus 1 includes a main board 10 and a user interface 20. The main board 10 is a computing device main body for controlling the user interface 20. The user interface 20 includes an imaging camera 22 and a display 24. In the present example, the imaging camera 22 includes a light source 22a for irradiating a target object in front, and a light receiving unit 22b that receives reflected light from the target object. The drawing illustrates a state in which the user away from and facing the display 24 points at a button icon on a menu screen displayed on the display 24, and an instruction icon (cursor icon) ICON is displayed in front of the fingertip in a superimposed manner.

Figure 2:
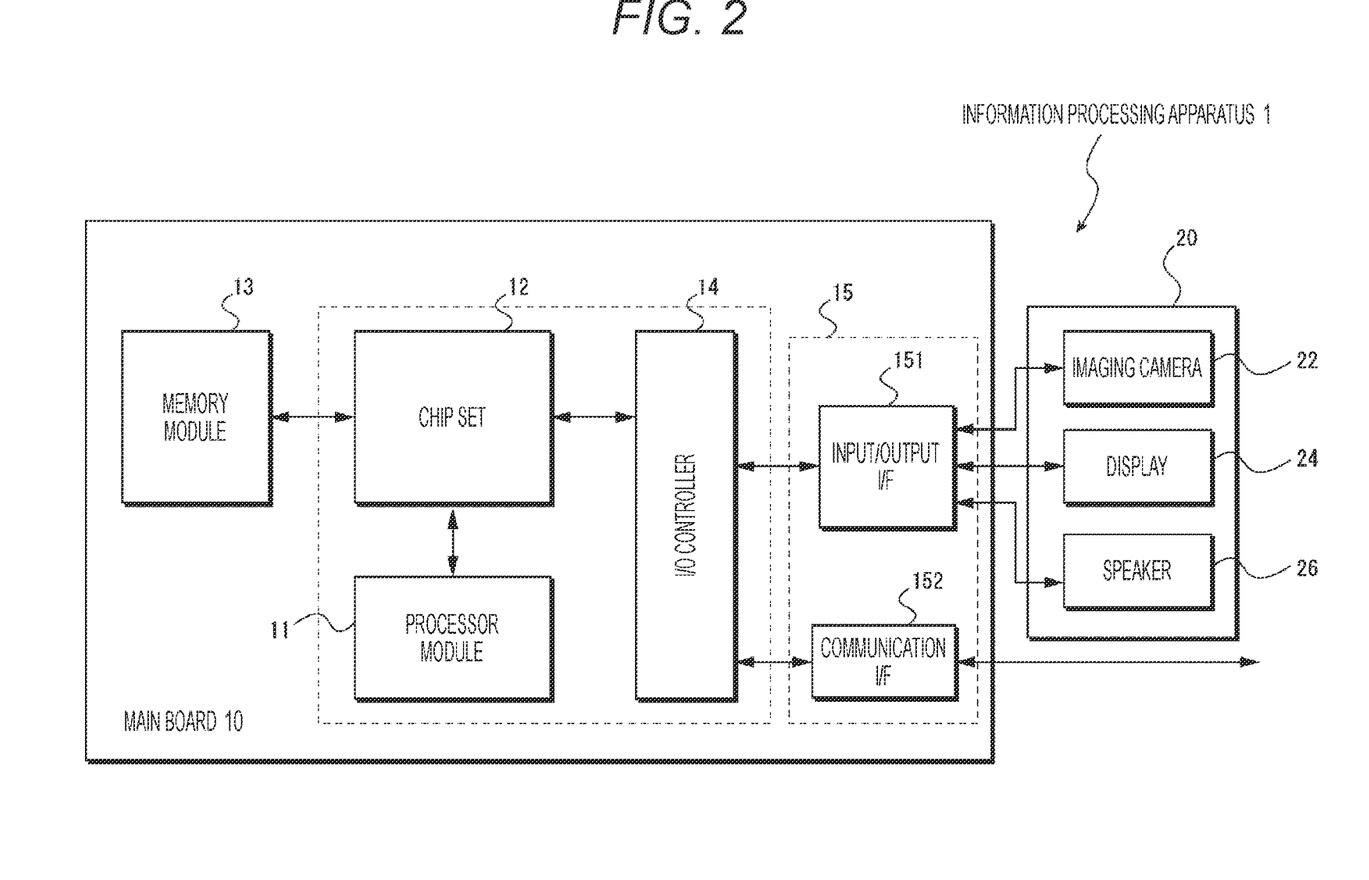
FIG. 2 is a block diagram illustrating an example of a hardware configuration of the information processing apparatus according to an embodiment of the present technology.

FIG. 2 is a block diagram illustrating an example of a hardware configuration of the information processing apparatus according to an embodiment of the present technology. In the drawing, among various hardware resources that constitute the information processing apparatus 1, the hardware resources particularly related to the present disclosure are illustrated.

As illustrated in the drawing, the information processing apparatus 1 illustrated in the present example typically includes the main board 10 that may include one or more processor modules 11, a chip set 12, a memory module 13, an I/O controller 14, and various peripheral interfaces 15, and the user interface 20 that may include various input/output devices 22 to 26.

The processor module 11 includes, for example, without limitation, a processor (processor core), a microcontroller, a digital signal processor, and/or a combination thereof. The chip set 12 includes a bridge for a bus connecting the processor module 11, the memory module 13, the I/O controller 14, and the like, and a circuit in which other components necessary for configuration of the information processing apparatus 1 are integrated.

The memory module 13 is typically a primary storage apparatus including a volatile memory (for example, a RAM), a non-volatile memory (for example, a ROM, a flash memory, or the like), and/or a combination thereof. The memory module 13 holds all or some of various software resources, for example, a device driver, an operating system (OS) program, one or more application programs, data, and the like, and is utilized by the processor module 11. In the present embodiment, the memory module 13 may hold a program (user interface device driver) for controlling the user interface 20. The data includes, for example, various display data for implementing the user interface 20.

The I/O controller 14 is a circuit that controls input/output with various peripheral interfaces 15 (for example, an input/output interface 151, a communication interface 152, and the like). The input/output interface 151 controls operation of external input/output devices such as the imaging camera 22, the display 24, and a speaker 26, for example. The communication interface 152 is a circuit that enables network communication with an external apparatus.

The imaging camera 22 is a device including an image sensor (not illustrated) that captures an image of movement of the user in an imaging area in front of the display 24. In the present disclosure, the image sensor is a distance measurement sensor that may measure a distance to the target object (for example, a face, a finger, or the like of the user) and output distance measurement data thereof. As the distance measurement sensor, for example, a TOF sensor is known. The TOF sensor may output distance measurement data regarding a distance to the target object in response to receiving reflected light from the target object, the reflected light being based on light emitted from the light source. As the TOF sensor, for example, a direct TOF sensor and an indirect TOF sensor are known. The distance measurement data is converted into distance image data by being processed by the processor module 11. The distance image data includes depth information (depth information) in a three-dimensional (XYZ) spatial coordinate system. The imaging camera 22 and the display 24 constitute the user interface 20 of non-contact type under control of the processor module 11. Note that, although the distance measurement sensor is used as the image sensor in the present disclosure, the image sensor is not limited thereto, and it is only required that an apparatus or configuration capable of acquiring three-dimensional position information is used as the image sensor.

The display 24 is a device for displaying a user interface screen including text or an image. Typically, the display 24 corresponds to a liquid crystal display or an organic display, but is not limited thereto, and may be, for example, a projection-type display device such as a projector.

The speaker 26 is a device that outputs audio or sound on the basis of an audio signal generated by a sound processor (not illustrated). The speaker 26 outputs, under control of the processor module 11, audio, a sound effect, or the like that assists or renders input operation by the user via the non-contact user interface 20, for example.

Figure 3:
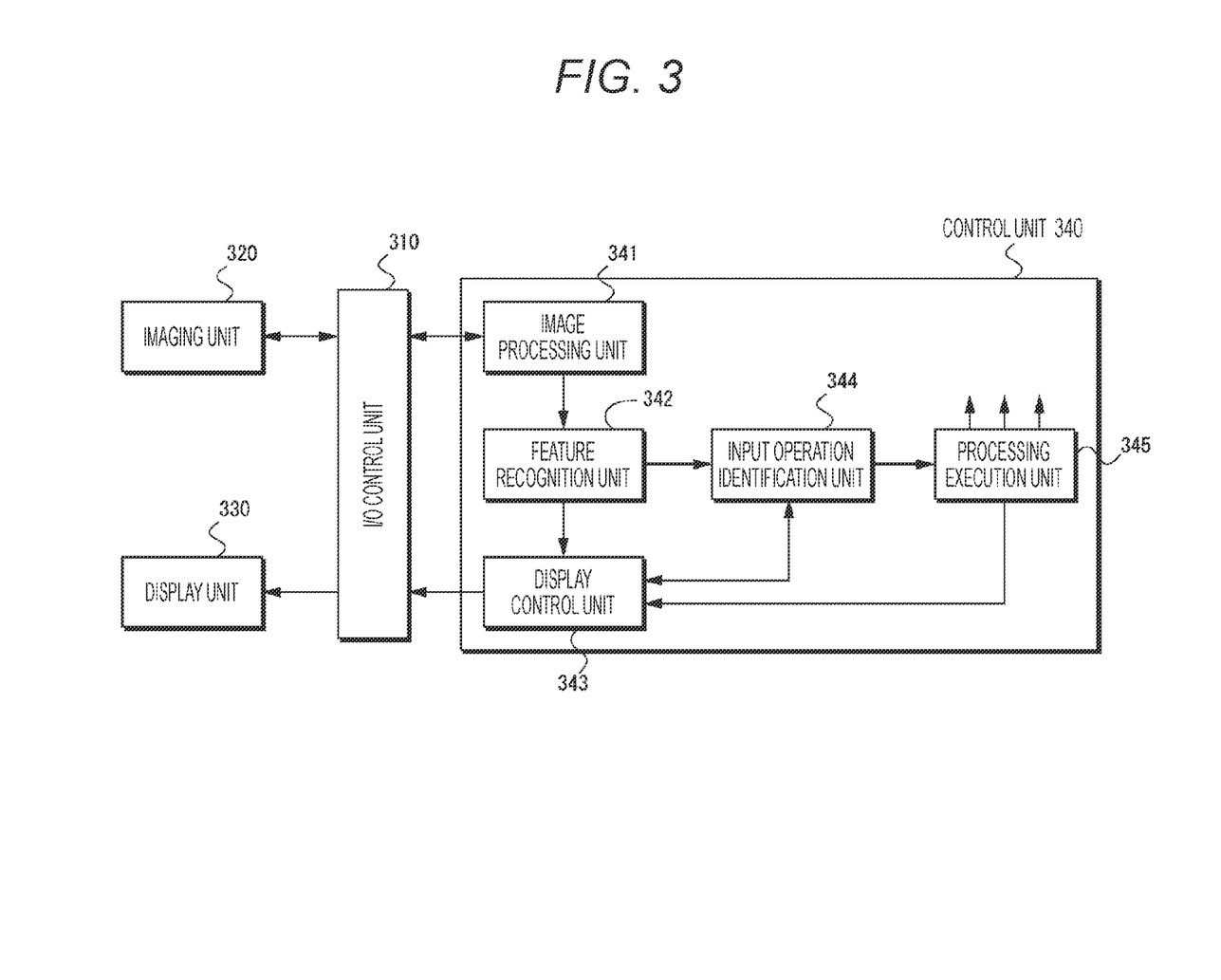
FIG. 3 is a block diagram illustrating an example of a functional configuration of the information processing apparatus according to an embodiment of the present technology.

FIG. 3 is a block diagram illustrating an example of a functional configuration of the information processing apparatus according to an embodiment of the present technology. In the drawing, among various components (components) of the information processing apparatus 1, the components particularly related to the present disclosure are illustrated. Such components may be implemented by the above-described hardware resources themselves or a part thereof and/or, for example, by a processor module of the information processing apparatus 1 executing various device drivers and programs on the OS in cooperation with various hardware resources.

As illustrated in the drawing, the information processing apparatus 1 of the present example includes an I/O control unit 310, a display unit 330, an imaging unit 320, and a control unit 340.

The I/O control unit 310 controls input/output with the imaging unit 320, the display unit 330, and the like. The imaging unit 320 emits light from the light source 22*a*, captures an image of the user in front of the screen of the display unit 330 by using the light receiving unit 22*b* (refer to FIG. 1), and outputs distance measurement data thereof to the control unit 340 via the I/O control unit 310. The display unit 330 is connected to a display control unit 343 via the I/O control unit 310, and, under control of the display control unit 343, displays a screen provided to the user. The screen provided to the user may be, for example, a menu screen, a keyboard screen, or the like including text or a graphical image. Furthermore, under control of the control unit 340, a predetermined icon or the like is displayed on the screen of the display unit 330 according to the movement of the specific part (for example, a fingertip or the like) of the user of which image is captured by the imaging unit 320, according to the movement of the specific part of the user, thereby implementing a non-contact user interface.

The control unit 340 comprehensively controls functions of the user interface 20 implemented on the information processing apparatus 1. The control unit 340 is implemented by the above-described processor module 11 executing a predetermined program to cooperate with other hardware resources. The control unit 340 may include, for example, an image processing unit 341, a feature recognition unit 342, the display control unit 343, an input operation identification unit 344, and a processing execution unit 345.

The image processing unit 341 acquires a sequence of the distance measurement data output from the imaging unit 320 every moment via the I/O control unit 310, and generates distance image data for each frame on the basis of the acquired sequence of the distance measurement data. The distance image data is three-dimensional spatial coordinate data including depth information. The image processing unit 341 passes the generated distance image data to the feature recognition unit 342.

The feature recognition unit 342 performs image recognition processing on the generated distance image data for each frame, extracts or recognizes a feature related to the specific part of the user, and generates and outputs a sequence of position information thereof. The feature includes, for example, a sequence of position information (vector information) in the three-dimensional spatial coordinate system. For example, the feature recognition unit 342 estimates a posture or body motion of the user on the basis of the distance image data, and further, three-dimensionally estimates the specific part, thereby recognizing the position/posture/movement of the feature. The feature recognition unit 342 passes the recognized feature to the display control unit 343 and the input operation identification unit 344.

The display control unit 343 generates two-dimensional image data (hereinafter, simply referred to as "image data") adapted to screen display of the display unit 330, and outputs the image data to the display unit 330 via the I/O control unit 310. As an example, on the basis of a feature of the specific part recognized by the feature recognition unit 342, the display control unit 343 generates image data including an instruction icon. As another example, the display control unit 343 generates image data such that animation display is performed in accordance with input operation identified by the input operation identification unit 344 as described later.

The input operation identification unit 344 identifies input operation according to content of the displayed screen on the basis of the feature of the specific part recognized by the feature recognition unit 342. The input operation may be based on a simple position and/or movement of the specific part of the user, or may be identified by a combination of a plurality of movements. For example, the input operation identification unit 344 judges, on the basis of the position information of the feature of the specific part recognized by the feature recognition unit 342 and the position information of, for example, a button icon or the like that is displayed on the screen, whether or not the button icon is pointed at, and, in a case where it is judged that the icon is pointed at, identifies the pointing as input operation by the user. Furthermore, the input operation identification unit 344 may recognize the movement of the specific part on the basis of the sequence of the position information of the feature. For example, on the basis of a first sequence of the position information of the feature, the input operation identification unit 344 may judge whether or not the specific part of the user stays at a predetermined place in the three-dimensional spatial coordinate system. Furthermore, on the basis of a second sequence of the position information of the feature, the input operation identification unit 344 may judge whether or not the specific part of the user has moved in a Z direction from the staying place in the three-dimensional spatial coordinate system. The input operation identification unit 344 notifies the display control unit 343 and the processing execution unit 345 of the identified input operation.

The processing execution unit 345 executes predetermined processing corresponding to the identified input operation. For example, in a case where the identified input operation is operation of selecting a button icon, the processing execution unit 345 executes processing associated with the button icon and/or commands another component (not illustrated) to execute the processing. In a case of changing the screen displayed on the display unit 330 by executing processing, the processing execution unit 345 commands the display control unit 343 to generate image data corresponding to the change of the screen.

Figure 4A:
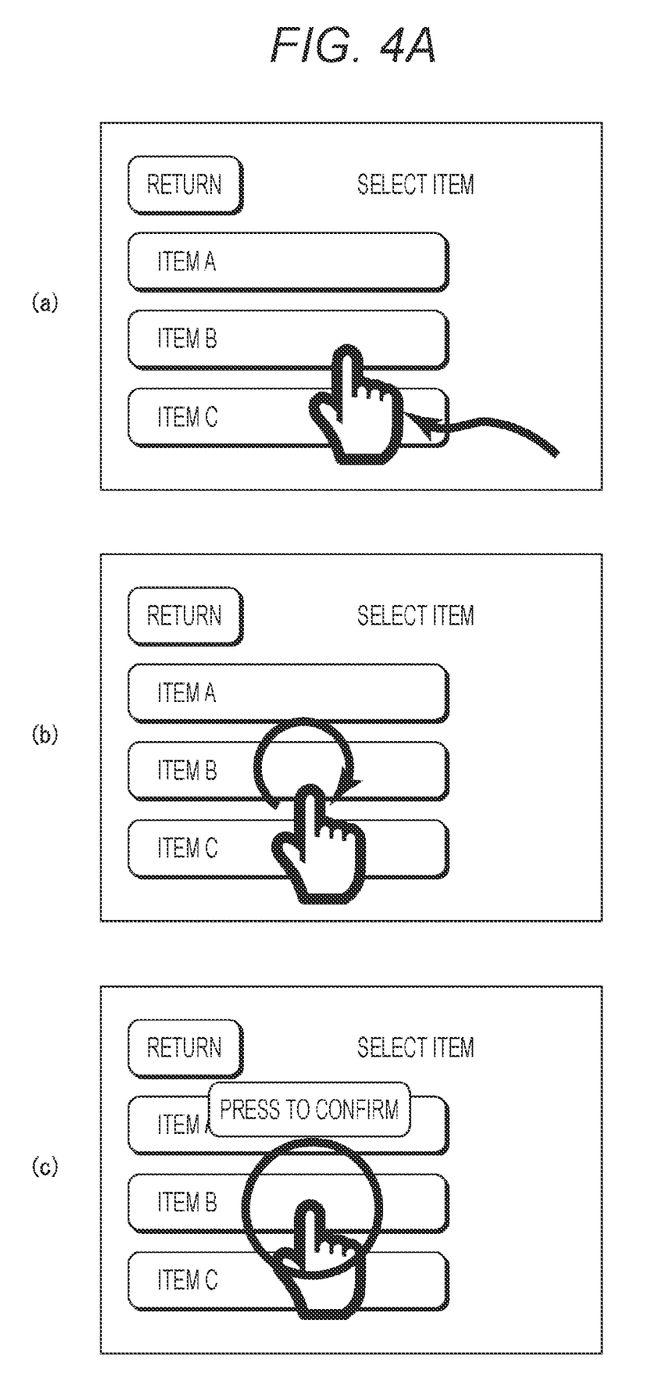
FIG. 4A is a diagram for describing an example of a screen of input operation by the user with respect to the user interface of the information processing apparatus according to an embodiment of the present technology.
Figure 4B:
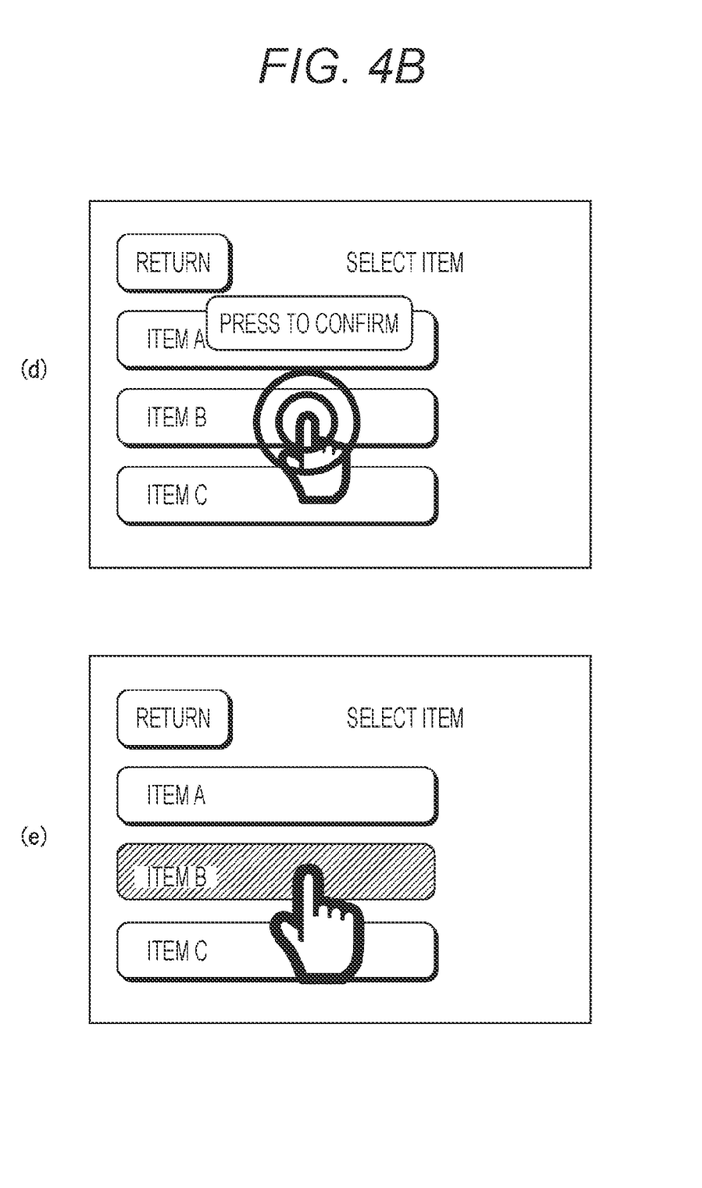
FIG. 4B is a diagram for describing an example of the screen of input operation by the user with respect to the user interface of the information processing apparatus according to an embodiment of the present technology.
Figure 5:
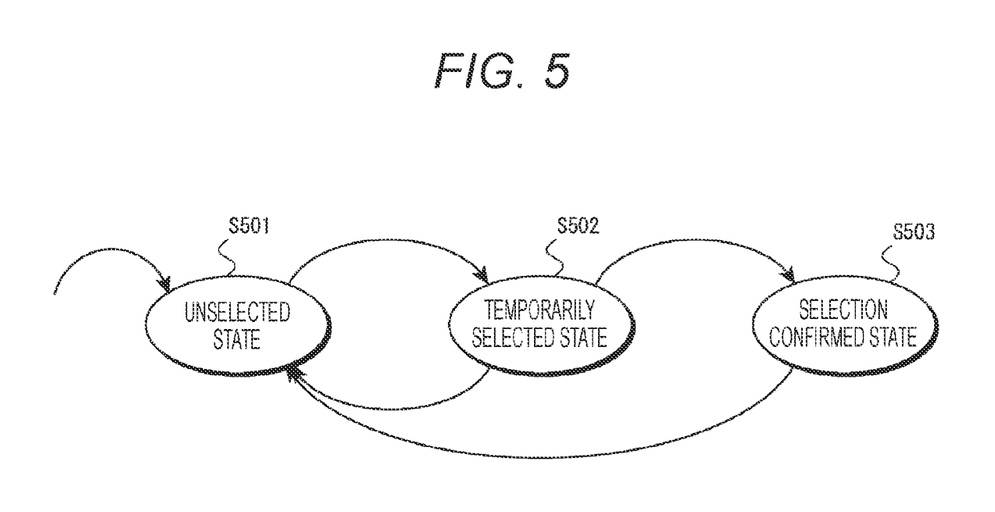
FIG. 5 is a diagram for describing an example of transition of a state of icon selection in user interface processing on the information processing apparatus according to an embodiment of the present technology.

FIGS. 4A and 4B are diagrams for describing an example of the screen of input operation by the user with respect to the user interface of the information processing apparatus according to an embodiment of the present technology. Furthermore, FIG. 5 is a diagram for describing an example of transition of a state of icon selection in user interface processing on the information processing apparatus according to an embodiment of the present technology. Each state illustrated in FIG. 5 is associated with each operation illustrated in FIGS. 4A and 4B.

FIG. 4A (a) illustrates a state in which a menu is displayed on the screen of the display 24 (display unit 330) and the user is about to select a button icon of Item B in a direction pointed to by a finger of the user. At this time, the control unit 340 of the information processing apparatus 1 is in an unselected state S401 (FIGS. 4A and 4B). Note that the user interface of the present disclosure is a non-contact user interface, and the screen and the finger are separated by a certain distance (refer to FIG. 1). For example, the control unit 340 performs control so that the instruction icon is displayed on the screen in accordance with the movement of the finger of the user.

Next, as illustrated in FIG. 4A (b), the user aligns a direction of the finger with the button icon of Item B to be selected, and moves the finger so as to draw a circle above the button icon of Item B, for example. Alternatively, the user may move the finger so as to draw a check mark above the button icon of Item B. With this arrangement, the control unit 340 judges that the finger stays in a vicinity of the button icon of Item B, and transitions to a temporarily selected state S402 of the button icon of Item B (FIG. 5). In this case, the control unit 340 may control the display of the screen so that the button icon of Item B is visually distinguished in order to cause the user to recognize that the button icon of Item B is in the temporarily selected state. For example, the control unit 340 may change color of the button icon of Item B to another color, or may perform control so that an emphasis icon is displayed in a superimposed manner as illustrated in FIG. 4A (c). With this arrangement, the user can recognize that the button icon of Item B has been brought into the temporarily selected state. Note that, in the drawing FIG. 4A (c), a message "Press to confirm" for prompting the user to perform operation of pressing down the button icon is displayed.

Next, as illustrated in FIG. 4B (d), the user moves the finger as if pressing the button icon of Item B on the screen. The control unit 340 judges that the finger has been pressed down above the button icon of Item B in the temporarily selected state, and transitions to a selection confirmed state S403 (FIG. 5). At this time, in order to cause the user to recognize the depression of the button icon, the control unit 340 may display an animation of the depression and emit a sound effect. After transitioning to the selection confirmed state S403, the control unit 340 returns to the unselected state S401 by, for example, executing predetermined processing associated with the button icon of Item B.

Note that, in a case where there is no press-down operation for a predetermined time in the temporarily selected state S402 of the button icon of Item B, the control unit 340 cancels the temporarily selected state, and returns to the unselected state S401.

Figure 6:
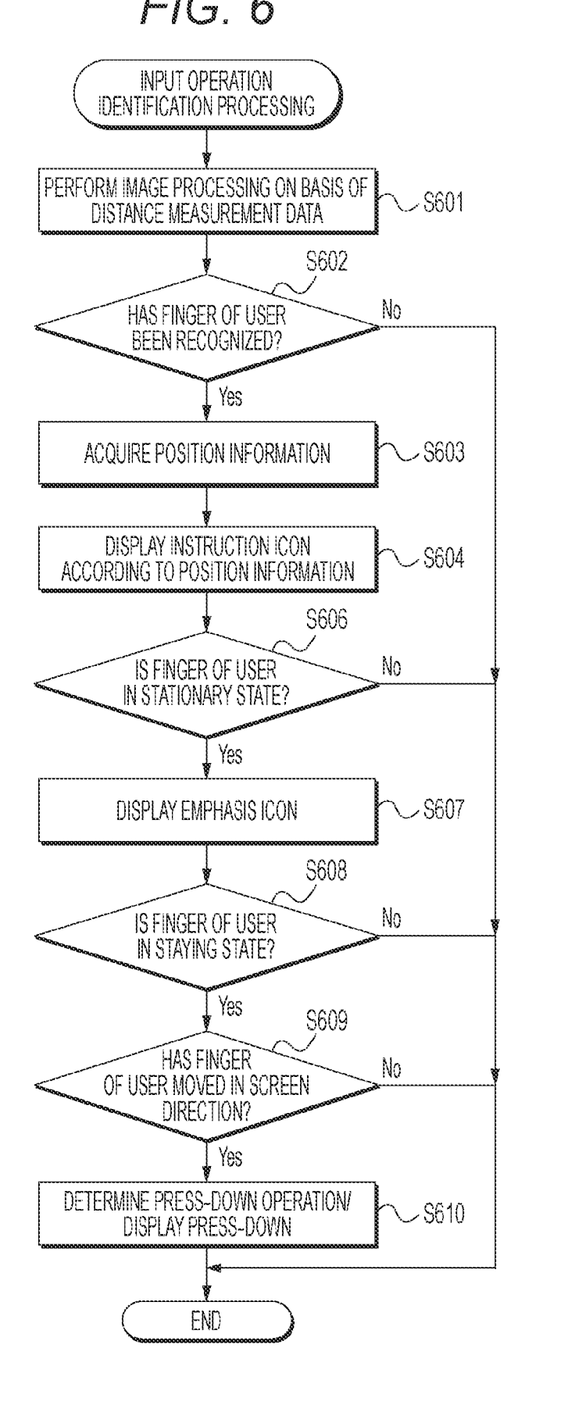
FIG. 6 is a flowchart for describing an example of user interface processing on the information processing apparatus according to an embodiment of the present technology.

FIG. 6 is a flowchart for describing an example of the user interface processing on the information processing apparatus according to an embodiment of the present technology. Such processing is implemented, for example, by the processor module 11 of the information processing apparatus 1 executing a predetermined user interface device driver to cooperate with the above-described hardware resources.

As illustrated in the drawing, in the control unit 340 of the information processing apparatus 1, the image processing unit 341 performs image processing on the basis of the sequence of the distance measurement data output from the imaging unit 320, and generates distance image data for each frame (S601). Subsequently, the feature recognition unit 342 extracts or recognizes a feature of the specific part of the user on the basis of the generated distance image data (S602). In the present disclosure, the feature recognition unit 342 recognizes the finger of the user as the specific part. In a case of having recognized the finger of the user on the basis of distance image data (Yes in S602), the feature recognition unit 342 acquires a sequence of position information of the finger of the user (S603). Note that, in a case where the feature recognition unit 342 has not been able to recognize the finger of the user (No in S602), the input operation identification processing is reset, and the processing moves to processing of distance image data of a next frame.

Subsequently, the display control unit 343 performs control so that an instruction icon is displayed on the screen according to the sequence of the acquired position information of the feature (S604). With this arrangement, the instruction icon is displayed on the screen according to a positional relation between the screen and the finger of the user. Note that the instruction icon is an example of a first icon.

On the basis of the sequence of the position information of the feature, the input operation identification unit 344 judges whether or not the finger of the user is in a stationary state (S606). The stationary state may include a state where the finger of the user substantially stays at the position for a certain period of time, if not completely stationary. The position where the finger of the user is in the stationary state is a reference position for determining a staying state as described later. For example, in a case where the user points at a button icon of an item displayed on the screen, even if the finger of the user slightly shakes, it may be judged that the finger of the user is in the stationary state as long as the button icon is pointed at for a certain time. In a case of having judged that the finger of the user is in the stationary state (Yes in S606), the input operation identification unit 344 instructs the display control unit 343 to display an emphasis icon on the screen, and the display control unit 343 performs control so that the emphasis icon is displayed on the screen (S607). Note that the emphasis icon is an example of a second icon. Note that, in a case where the input operation identification unit 344 has not been able to recognize the stationary state of the finger of the user (No in S606), the input operation identification processing is reset, and the processing moves to processing of distance image data of a next frame.

Subsequently, the input operation identification unit 344 judges whether or not the finger of the user is in the staying state for a predetermined time (S608). The predetermined time is measured, for example, from a time point when it is judged that the finger of the user is in the stationary state. Furthermore, in a case where the finger of the user stays, for example, within a predetermined range from the position at which the finger of the user is in the stationary state (reference position), the input operation identification unit 344 judges that the finger of the user is in the staying state (Yes in S608). Alternatively, in a case where the finger of the user performs a characteristic movement as if, for example, drawing a circle or drawing a check mark within the predetermined range, the input operation identification unit 344 may judge that the user is in the staying state. The characteristic movement is, for example, a movement (a vector component in an X-Y direction is mainly included) performed on a plane parallel to the screen. Note that, in a case where the input operation identification unit 344 has not been able to recognize the staying state of the finger of the user (No in S608), the input operation identification processing is reset, and the processing moves to processing of distance image data of a next frame.

Subsequently, on the basis of the acquired sequence of the position information, the input operation identification unit 344 judges whether or not the user has performed press-down operation with the finger, that is, whether or not the finger of the user has moved in the Z direction by a predetermined movement amount (S609). That is, depending on whether or not the finger of the user has approached in a screen direction from a staying-state position, the input operation identification unit 344 judges whether or not the press-down operation has been performed. Thus, in the present disclosure, movement in a depth direction is detected with respect to the staying-state position without defining a plane of a virtual touch panel.

In a case of having judged that the finger of the user has approached in the screen direction from the staying-state position (Yes in S609), the input operation identification unit 344 identifies the input operation by the movement of the finger of the user, and accordingly, the display control unit 343 performs control so that an animation of pressing down is displayed on the screen (S610). Furthermore, the processing execution unit 345 executes processing corresponding to input operation performed on the basis of the displayed screen. Note that, in a case where the input operation identification unit 344 has not been able to recognize the press-down operation of the finger of the user (No in S609), the input operation identification processing is reset, and the processing moves to processing of distance image data of a next frame.

As described above, the information processing apparatus 1 including the user interface of the present disclosure can, in response to the movement of the specific part of the user in an X-Y plane, move the instruction icon on the screen of the display away from the user, and after detecting the staying state of the specific part in the X-Y plane, the information processing apparatus 1 can, in response to the movement of the specific part in the Z direction with reference to the staying state of the specific part, receive input operation of selection confirmation, thereby being able to reduce malfunction in non-contact operation.

Each of the above-described embodiments is an example for describing the present technology, and is not intended to limit the present technology only to these embodiments. The present technology can be implemented in various forms without departing from the gist thereof.

For example, in the methods disclosed herein, steps, operations, or functions may be implemented in parallel or in a different order as long as results of such implementation are consistent. The described steps, operations, and functions are provided merely as examples, and some of the steps, operations, and functions may be omitted without departing from the gist of the invention or may be combined and integrated, or another step, operation, or function may be added.

Furthermore, among the various embodiments disclosed herein, a certain feature (technical matter) in one embodiment can be, with appropriate improvement, added to another embodiment or replaced with a specific feature in the another embodiment, and such forms are also included in the gist of the present technology.

Furthermore, the present technology may include the following technical matters.

(1) An information processing apparatus adapted to a user interface that enables non-contact input operation according to a screen displayed on a display, the information processing apparatus including an input operation identification unit that identifies predetermined input operation on the basis of a sequence of position information of a specific part of a user in a predetermined spatial coordinate system, and a processing execution unit that executes predetermined processing on the basis of the predetermined input operation identified by the input operation identification unit, in which the input operation identification unit judges, on the basis of a first sequence of the position information, whether or not the specific part of the user is in a staying state at a reference position in the predetermined spatial coordinate system, in a case of having judged that the specific part of the user is in the staying state, judges, on the basis of a second sequence of the position information, whether or not the specific part of the user is in a moving state, and in a case of judging that the specific part of the user is in the moving state, identifies the predetermined input operation.

(2) The information processing apparatus according to (1), further including an image processing unit that generates distance image data for each frame on the basis of acquired distance measurement data, a feature recognition unit that recognizes the specific part of the user in the predetermined spatial coordinate system on the basis of the distance image data generated by the image processing unit, and a display control unit that performs control so that a first icon is displayed at a position on the screen, the position being corresponding to a position of the specific part in the predetermined spatial coordinate system, the specific part being recognized by the feature recognition unit.

(3) The information processing apparatus according to (2), further including an imaging unit including a distance measurement sensor that measures a distance to a target object in response to receiving reflected light from the target object, the reflected light being based on light emitted from a light source, in which the imaging unit outputs the distance measurement data related to the measured distance.

(4) The information processing apparatus according to (2), in which, in a case where it is judged that the specific part stays in the predetermined spatial coordinate system for a predetermined time, the input operation identification unit sets a position at which the specific part stays as the reference position.

(5) The information processing apparatus according to (4), in which, in the staying state, the display control unit performs control so that a second icon is displayed at a position on the screen, the position being corresponding to a position at which the specific part stays.

(6) The information processing apparatus according to (4), in which, in the moving state, the display control unit controls display of the screen so that the movement is expressed.

(7) The information processing apparatus according to (1), in which, in a case where the specific part of the user is within a predetermined range based on the reference position, the input operation identification unit judges that the specific part of the user is staying.

(8) The information processing apparatus according to (7), in which, in a case where the specific part of the user moves on a plane parallel to the screen, the input operation identification unit judges that the specific part of the user is staying.

(9) The information processing apparatus according to (1), in which, in a case where it is judged that the specific part of the user has moved in a direction toward the screen from the user by a predetermined movement amount, the input operation identification unit judges that the specific part of the user is in the moving state.

(10) The information processing apparatus according to (2), in which the display control unit performs control so that a menu screen including at least one icon is displayed on the display, and the input operation identification unit identifies input operation with respect to the at least one icon.

(11) The information processing apparatus according to (10), in which the display control unit performs control so that a first icon is displayed at a position on the screen, the position being corresponding to identified the at least one icon.

(12) An information processing method based on input operation by a user via a non-contact user interface, the information processing method including displaying a predetermined screen on a display, acquiring a sequence of position information of a specific part of the user in a predetermined spatial coordinate system with respect to the predetermined screen, identifying predetermined input operation on the basis of acquired the sequence of the position information, and executing predetermined processing on the basis of identified the predetermined input operation, in which the identifying the predetermined input operation includes judging, on the basis of a first sequence of the position information, whether or not the specific part of the user is in a staying state at a reference position in the predetermined spatial coordinate system, after judging that the specific part of the user is in the staying state, judging, on the basis of a second sequence of the position information, whether or not the specific part of the user is in a moving state, and in a case of judging that the specific part of the user is in the moving state, identifying the predetermined input operation.

(13) A computer program for causing a computing device to implement an information processing method based on input operation by a user via a non-contact user interface, in which the information processing method includes displaying a predetermined screen on a display, acquiring a sequence of position information of a specific part of the user in a predetermined spatial coordinate system with respect to the predetermined screen, identifying predetermined input operation on the basis of acquired the sequence of the position information, and executing predetermined processing on the basis of identified the predetermined input operation, and the identifying the predetermined input operation includes judging, on the basis of a first sequence of the position information, whether or not the specific part of the user is in a staying state at a reference position in the predetermined spatial coordinate system, after judging that the specific part of the user is in the staying state, judging, on the basis of a second sequence of the position information, whether or not the specific part of the user is in a moving state, and in a case of judging that the specific part of the user is in the moving state, identifying the predetermined input operation.

REFERENCE SIGNS LIST

1 Information processing apparatus
10 Main board
11 Processor module
12 Chip set
13 Memory module
14 I/O controller
15 Peripheral interface
151 Input/output interface
152 Communication interface
20 User interface
22 Imaging camera
22a Light source
22b Light receiving unit
24 Display
26 Speaker
310 I/O control unit 320 Imaging unit
330 Display unit
340 Control unit
341 Image processing unit
342 Feature recognition unit
343 Display control unit
344 Input operation identification unit
345 Processing execution unit

The invention claimed is:

1. An information processing apparatus, comprising:
circuitry configured to:
 acquire a first sequence of position information of a specific part of a user, wherein the first sequence of the position information is in a specific spatial coordinate system;
 determine, based on the first sequence of the position information, the specific part of the user stays at a reference position for a first time period, wherein the reference position is in the specific spatial coordinate system;
 determine, at a time point, the specific part of the user is in a stationary state based on the determination that the specific part of the user stays at the reference position for the first time period;
 determine the specific part of the user stays within a specific range from the reference position for a second time period, wherein the second time period is based on the time point of the determination of the stationary state of the specific part of the user;
 determine the specific part of the user is in a staying state based on the determination that the specific part of the user stays within the specific range from the reference position for the second time period;
 acquire a second sequence of the position information;
 determine, based on the determination that the specific part of the user is in the staying state and the second sequence of the position information, the specific part of the user is in a moving state;
 identify a first input operation based on the determination that the specific part of the user is in the moving state; and
 execute specific processing based on the identified first input operation.

2. The information processing apparatus according to claim 1, wherein the circuitry is further configured to:
 acquire distance measurement data;
 generate distance image data for each of a plurality of frames based on the acquired distance measurement data;
 recognize the specific part of the user in the specific spatial coordinate system based on the distance image data; and
 control a display screen to display a first icon at a first position on the display screen, wherein the first position corresponds to a position of the specific part in the specific spatial coordinate system.

3. The information processing apparatus according to claim 2, further comprising a distance measurement sensor configured to:
 receive reflected light from a target object;
 measure a distance to the target object based on the received reflected light from the target object, wherein the reflected light is based on light emitted from a light source; and
 output the distance measurement data based on the measured distance.

4. The information processing apparatus according to claim 2, wherein
 the circuitry is further configured to control, based on the determination that the specific part of the user is in the staying state, the display screen to display a second icon at a second position on the display screen, and
 the second position corresponds to the reference position at which the specific part stays.

5. The information processing apparatus according to claim 2, wherein the circuitry is further configured to control, based on the determination that the specific part of the user is in the moving state, the display screen to display information indicating a movement of the specific part of the user.

6. The information processing apparatus according to claim 2, wherein in a case the specific part of the user moves on a plane parallel to the display screen, the circuitry is further configured to determine the specific part of the user is in the staying state.

7. The information processing apparatus according to claim 2, wherein the circuitry is further configured to:
 determine the specific part of the user moves in a direction toward the display screen from the user by a specific movement amount; and
 determine, based on the determination that the specific part of the user moves in the direction toward the display screen from the user by the specific movement amount, the specific part of the user is in the moving state.

8. The information processing apparatus according to claim 2, wherein the circuitry is further configured to:
 control the display screen to display a menu screen including at least one icon; and
 identify a second input operation corresponding to the at least one icon.

9. The information processing apparatus according to claim 8, wherein the circuitry is further configured to control the display screen to display the first icon at a second position corresponding to the at least one icon.

10. An information processing method, comprising:
 acquiring a first sequence of position information of a specific part of a user, wherein the first sequence of the position information is in a specific spatial coordinate system;
 determining, based on the first sequence of the position information, the specific part of the user stays at a reference position for a first time period, wherein the reference position is in the specific spatial coordinate system;
 determining, at a time point, the specific part of the user is in a stationary state based on the determination that the specific part of the user stays at the reference position for the first time period;
 determining the specific part of the user stays within a specific range from the reference position for a second time period, wherein the second time period is based on the time point of the determination of the stationary state of the specific part of the user;
 determining the specific part of the user is in a staying state based on the determination that the specific part of the user stays within the specific range from the reference position for the second time period;
 acquiring a second sequence of the position information;
 determining, based on the determination that the specific part of the user is in the staying state and the second sequence of the position information, the specific part of the user is in a moving state;

identifying a specific input operation based on the determination that the specific part of the user is in the moving state; and executing specific processing based on the identified specific input operation.

11. A non-transitory computer-readable medium having stored thereon, computer-executable instructions which, when executed by a computing device, cause the computing device to execute operations, the operations comprising:

acquiring a first sequence of position information of a specific part of a user, wherein the first sequence of the position information is in a specific spatial coordinate system;

determining, based on the first sequence of the position information, the specific part of the user stays at a reference position for a first time period, wherein the reference position is in the specific spatial coordinate system;

determining, at a time point, the specific part of the user is in a stationary state based on the determination that the specific part of the user stays at the reference position for the first time period;

determining the specific part of the user stays within a specific range from the reference position for a second time period, wherein the second time period is based on the time point of the determination of the stationary state of the specific part of the user;

determining the specific part of the user is in a staying state based on the determination that the specific part of the user stays within the specific range from the reference position for the second time period;

acquiring a second sequence of the position information;

determining, based on the determination that the specific part of the user is in the staying state and the second sequence of the position information, the specific part of the user is in a moving state;

identifying a specific input operation based on the determination that the specific part of the user is in the moving state; and executing specific processing based on the identified specific input operation.

\* \* \* \* \*